United States Patent [19]
Mayr et al.

[11] Patent Number: 5,312,533
[45] Date of Patent: May 17, 1994

[54] ELECTRODE ELEMENT FOR ELECTROLYTIC PURPOSES AND ITS USE

[75] Inventors: Max Mayr, Alzenau; Wolfgang Blatt, Wächtersbach; Harri Heinke, Erlensee, all of Fed. Rep. of Germany

[73] Assignee: Heraeus Electrochemie GmbH, Hanau, Fed. Rep. of Germany

[21] Appl. No.: 916,877

[22] PCT Filed: Jan. 12, 1991

[86] PCT No.: PCT/EP91/00043
  § 371 Date: Aug. 5, 1992
  § 102(e) Date: Aug. 5, 1992

[87] PCT Pub. No.: WO91/12358
  PCT Pub. Date: Aug. 22, 1991

[30] Foreign Application Priority Data

Feb. 6, 1990 [DE] Fed. Rep. of Germany ....... 4003516

[51] Int. Cl.⁵ .................................................. C25C 7/02
[52] U.S. Cl. .................................... 204/282; 204/288; 204/289
[58] Field of Search ................ 204/280, 283, 288, 289, 204/282

[56] References Cited

U.S. PATENT DOCUMENTS

| | | | |
|---|---|---|---|
| 3,708,415 | 1/1973 | Hubbard | 204/257 |
| 4,085,026 | 4/1978 | Halford | 204/242 |
| 4,605,483 | 8/1986 | Michaelson | 204/280 |

FOREIGN PATENT DOCUMENTS

| | | |
|---|---|---|
| 1181035 | 1/1985 | Canada . |
| 1166651 | 6/1958 | France . |
| 2213804 | 8/1974 | France . |
| 2520760 | 8/1983 | France . |

*Primary Examiner*—Kathryn Gorgos
*Attorney, Agent, or Firm*—Frishauf, Holtz, Goodman & Woodward

[57] ABSTRACT

In order to prevent mechanical damage to electrode surfaces and to facilitate easy swapping out of immersible electrodes for inspection or replacement, an electrode element for an electrolysis cell for electrolytic precipitation of metals from a liquid containing metal ions has a frame (1) provided with parallel side sections (2, 3) of electrically insulating plastic. Each element includes at least one conduit (13) for supplying a liquid ion conductor and at least one conduit (16) for the removal of this liquid ion conductor. There is at least one planar active part is disposed between the conduits to serve as an electrode (7), along which the ion conductor flows. The active surface of the electrode (7) is covered by an ion exchange diaphragm (20). The electrode element is adapted for partial dipping, up to a predetermined immersion line (17), in the liquid. The electrode (7) is removably supported in the side sections (2, 3) of the frame (1). The diaphragm (20) defines a pouch enclosing at least the portion of the electrode (7) dipped into the metal-ion-containing liquid. The pouch is enclosed by a protective box (21) of an electrically insulating plastic provided with openings (22), where at least a portion of the openings (22) are directed toward an active surface of the electrode (7).

7 Claims, 3 Drawing Sheets

ELECTRODE ELEMENT FOR ELECTROLYTIC PURPOSES AND ITS USE

The invention relates to an electrode element for electrolytic purposes, in particular for an electrolysis cell for electrolytic precipitation of metals from a liquid containing metal ions, having a frame provided with parallel side sections of electrically insulating plastic, each with at least one conduit for supplying a liquid ion conductor and at least one conduit for the removal of this ion conductor, where at least one plate-shaped active part is disposed between both conduits to serve as an electrode, along which the ion conductor flows and where the active surface of the electrode is covered by an ion exchange diaphragm, as well as to its use.

BACKGROUND

The electrode element is preferably intended for use as an anode in an electrolysis cell, such as is known from German Letters Patent DE-PS 36 40 020; because of a plurality of cathodes and comparatively few anodes, the electrolysis cell disclosed in this Letters Patent has an advantageous surface ratio of cathodes to anodes. Here, it is possible, for example, to separate the cathode chamber filled with waste water from the anodes by means of a diaphragm, so that the anode(s) are located in a closed-off anolyte chamber which protects the anode from the process liquid which might contain aggressive substances. The anolyte chambers are provided with their own electrolyte supply and removal devices for circulation. The anodes located in the anolyte chambers have a flat structure, and the anode surfaces are disposed parallel to the surfaces of the cathodes.

In this known device, the cover and corrosion of the diaphragm to be placed on the frame of the anodes as well as protection of the diaphragm against the metal precipitated on the adjacent cathodes presents problems, where it is possible, particularly when removing the cathode, that the adjacent diaphragm becomes damaged.

Furthermore, an electrode is known from U.S. Pat. No. 4,608,144 having a frame of electrically insulating plastic into which an electrode plate made on the basis of plastic is integrated. The lower part and the upper part of the insulated frame are each provided with a chamber-like liquid supply and liquid removal device which terminates in a plurality of individual conduits provided by the surface of the electrode structure. By the employment of a plurality of electrode plates disposed parallel to each other and separated by diaphragms, it is possible to construct a bipolar electrode with alternatingly inserted anode and cathode parts; such a bipolar electrode is suitable for chloralkali electrolysis. However, because of the lack of space between the cathode and the diaphragm, the precipitation of metal on this bipolar electrode is not possible.

An electrode arrangement in a metal recovery cell for cleaning industrial process solutions and waste water in a reservoir is known from European Patent Disclosure EP-OS 36 640, which for retaining plate-shaped electrodes has an open frame of parallel lateral strips as spacing elements and consists of electrically-insulating corrosion-resistant plastic; cathodes are disposed on both sides of the anode at a distance set by the frame, and no diaphragms or membranes are provided between the electrodes.

The cell is integrated into the reservoir and the input and output to the electrolysis chamber between the electrodes are kept free in order to obtain a circulation which generates gas bubbles between the reservoir chamber and the electrolysis chamber. On the one hand, the distance between the electrodes, must be large enough to provide space for precipitated metals but, on the other hand, not too great so that sufficient metal precipitation up to a remaining concentration of $\leq 1$ ppm of metal ions can be achieved.

SUMMARY OF THE INVENTION

It is the object of the invention to provide an electrode element, the electrode chamber of which is to be separated from the remaining electrolysis chamber by a diaphragm without sealing problems and without corrosion problems such as can occur because of bolting together and associated bolt elements, and to provide protection of the diaphragm against exterior mechanical damage.

The electrode element is intended to be employable as an anode in a metal recovery cell as well as a cathode in an electrolytic cell.

In a preferred embodiment, the two side sections of the frame are connected with each other by two straps, where the lower strap has openings for supplying the liquid ion conductor and the upper strap has at least one opening for removing the ion conductor. The ion exchange diaphragm embodied in the shape of a pocket is clamped between the side sections of the frame and the protective box.

The electrode is formed by two plates which are parallel in respect to each other and are connected on their side walls by a fold, where the fold is used for guidance in the side sections of the frame; the side sections of the frame are provided with oppositely located guide rails which have grooves for inserting the folds embodied as edge strips.

In a preferred use, the electrode element is employed as the anode of a metal recovery cell; in this case, the anode is surrounded on both sides by two or more cathodes.

In a further preferred use, the electrode element is employed as a cathode in an oxidation cell; in this case, one side of the cathode is disposed opposite a plurality of anode elements or is surrounded on both sides by anode elements; it is also possible to dispose two cathodes placed opposite each other at a distance, where between the cathodes a plurality of anodes, and if required, one or a plurality of additional cathodes are inserted. In this case, the electrode element is used in particular in cells with fluoride-containing liquid ion conductors.

The comparatively simple electrode construction in accordance with which the use of corrosion-threatened bolt connections is avoided has been shown to be advantageous. In addition, this electrode element has proven to be very easy to maintain, because on account of the simple-to-remove pouch, it provides an opportunity for a rapid check of the state of the electrodes as well as quick cleaning. This electrode element can also be stored in a container, in which case drying out of the diaphragm is prevented.

In comparison with customary cells with anodes and cathodes arranged in pairs, there is a considerable savings in diaphragm material in connection with the employment of the electrode element as the cathode in an oxidation cell.

BRIEF DESCRIPTION OF THE DRAWINGS

The subject of the invention will be explained in detail below with the aid of FIGS. 1 to 5c.

FIG. 2 is a longitudinal section through the electrode element, while

DETAILED DESCRIPTION

Figure 1:
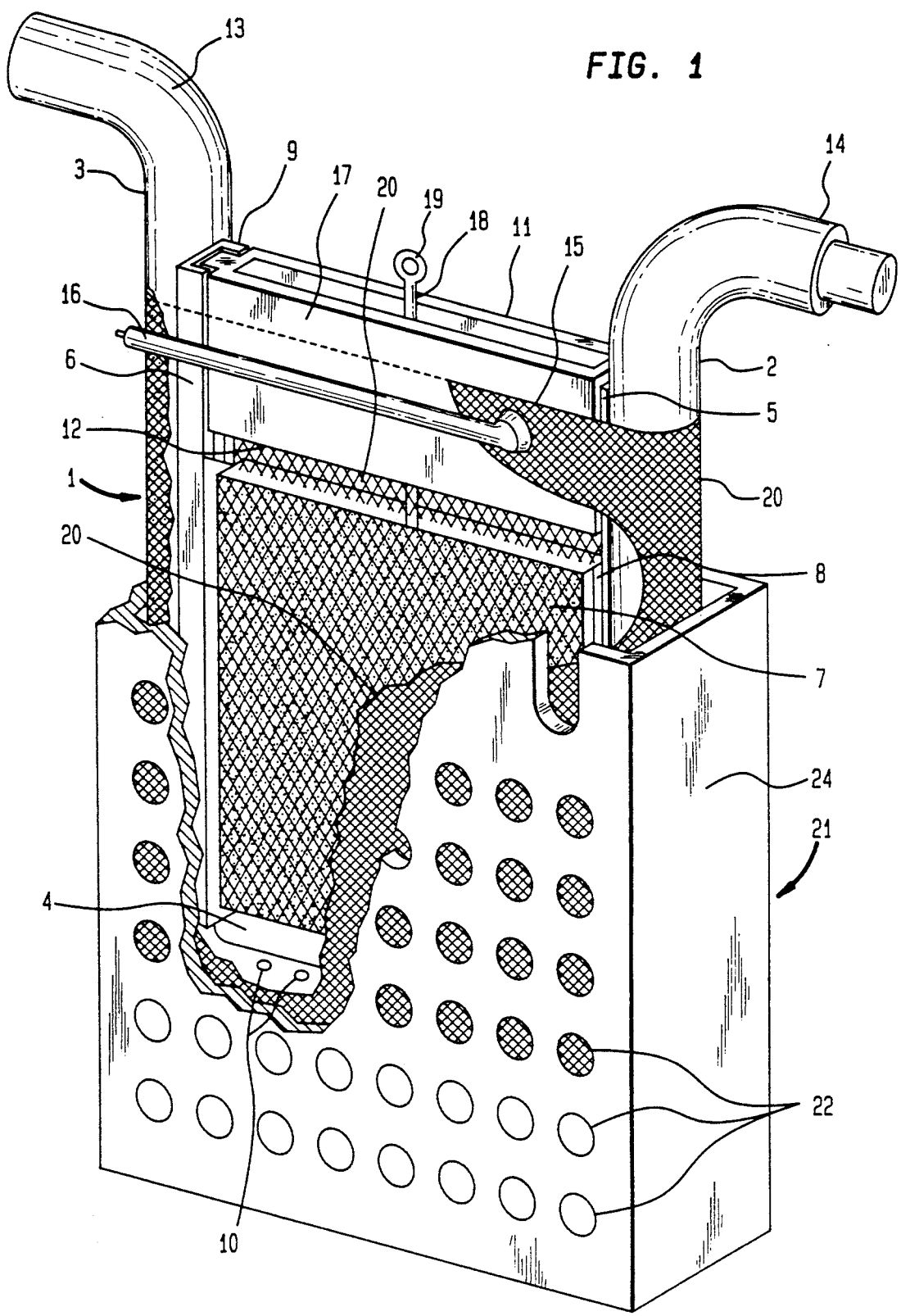
FIG. 1 is a cutaway view of the electrode partially pulled out of the housing of the protective casing.

In accordance with FIG. 1, the frame 1 of the electrode element has an electrode retainer of two side sections 2, 3 extending parallel to each other, which on their lower part are curved into a U-shaped frame part by a lower strap 4, where the side sections 2, 3 and the strap 4 are in the shape of a hollow pipe. The side sections 2, 3 are each provided on their flanks located opposite each other with a U-shaped guide rail 5, 6, which are used to receive the edge strips 8, 9 of the plate-shaped electrode 7, where the latter is embodied in the shape of a box electrode and is inserted with its edge strips in the shape of a fold until it stops in the area of the lower strap 4. The electrode consists of expanded metal, where titanium or a titanium-based alloy is preferably employed as the material. When used as an anode, it has an electro-active surface. The side section 2 and the lower strap 4 are embodied as hollow-cylindrical pipes, the strap 4 having openings 10 for the supply of the liquid ion conductor on its upper side which are directed towards the electrode 7. An upper strap 11, which can be pushed into the guide rails 5, 6, is located above the electrode 7 and its bottom side is provided with an opening 12 for removal of the liquid ion conductor.

Supply of the ion conductor is accomplished via the inlet connector 13, angled off at a right angle from the side section 3, while the pipe section 14 placed on the side section 2 is closed off to form a blind pipe and is only used for supporting the electrode in the electrolysis cell, not shown here. For removing the ion conductor, the upper strap 11 is connected with an outflow pipe 16 extending out of an opening 15. The frame 1 is inserted up to the line 17, shown in dashes, into an ion exchange diaphragm 20 in the shape of a pouch and only partially shown, which firmly encloses the two side sections 2, 3 and the strap 4, where, below its upper edge indicated by the line 17, the ion exchange diaphragm has an opening for the outflow pipe 16 corresponding to the opening 15. At the level of the line 17, the ion exchange diaphragm 20 is clamped with its upper edge on the upper strap 11 and with the two side sections 2, 3 between the strap 11, pipe 13, 14 and the protective box 21, which will be described hereinbelow. A current supply 18 is fastened on the upper edge of the electrode 7 and is conducted through the interior of the upper strap 7 to the outside and provided with a connecting contact 19.

Titanium or a titanium-based alloy is provided as the material; however, it is also possible to employ other valve metals, such as tantalum; in addition to the expanded metal form, use of connected sheet metal panels or use of electrically conductive ceramic bodies or electrically conductive plastic bodies with plate-shaped surfaces as electrodes is possible; for use as an anode, activation of the surface is then provided.

The inlet connector 13 used as supply pipe and the outflow pipe 16 are aligned parallel to each other. A protective mat of an electrolyte-resistant plastic, not shown here for reasons of greater clarity, is disposed between the ion exchange diaphragm 20 and the electrode 7 as a protection of the diaphragm against damage by the extended metal, preferably used as the electrode material; this mat may have lozenge-shaped openings, for example.

After the frame 1 has been inserted into the pouch-shaped ion exchange diaphragm 20, the upper edge of the latter rests against the upper strap 11; then the electrode frame, provided with the diaphragm, is inserted into the protective box 21 of an electrically insulating, electrolyte-resistant plastic, provided with openings 22. The openings 22 provided on both sides of the front face of the protective box 21 extend over the entire active surface of the electrode 7, where in this area the ratio of the total surface formed by the openings to the front face of the electrode lies in the range between 50 to 90%. Because of this, it is assured that, one the one hand, sufficient wetting of the ion exchange diaphragm 20 is attained and, on the other, its exterior support. The side wall of the protective box 21 identified by the numeral 24 is a closed surface and does not contain openings. The front surface of the electrode has a width in the range between 400 to 600 mm and a height in the range between 800 to 1000 mm. The current density which can be attained on the electrode lies in the range between 1 to 2500 A/m$^2$.

Polypropylene has proven itself as the material for the frame, including the center straps and supply and outflow lines, as well as for the protective box. The thickness of the protective box lies in the range between 3 to 5 mm.

Figure 2:
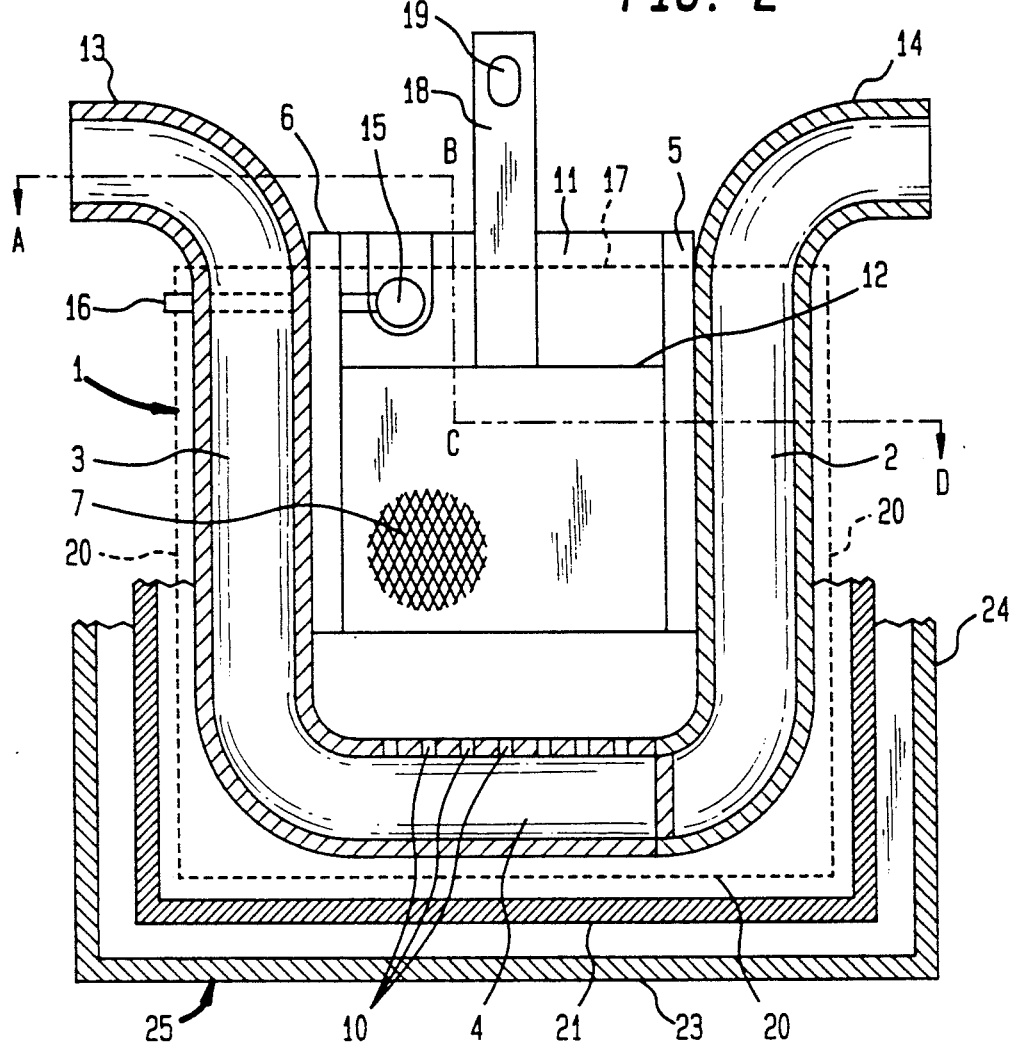

In accordance with FIG. 2, the liquid ion conductor is supplied via the supply line 13 and the pipe-shaped side section 3 to the also pipe-shaped lower strap 4, which is provided with openings 10 to deliver the ion conductor. The plate-shaped electrode 7 is disposed above the lower strap and is provided with a current supply line 18 and the connecting contact 19 on its upper edge. Removal of the liquid ion conductor takes place via the opening 15 located in the upper strap 11 and via the outflow pipe 16, shown partially symbolically by dashed lines, which moves the liquid received by the lower opening 12 of the upper central strap away.

The lower strap 4 is hermetically sealed in the direction of the also pipe-shaped side section 2, the side section 2 only performing the already described support and stabilizing functions. A portion of the bottom 23 and a portion of the side wall 24 of the electrolytic tank 25 is symbolically shown in part in the lower portion of FIG. 2; for reason of increased clarity the protective box 21 is also shown only partially.

Figure 3:
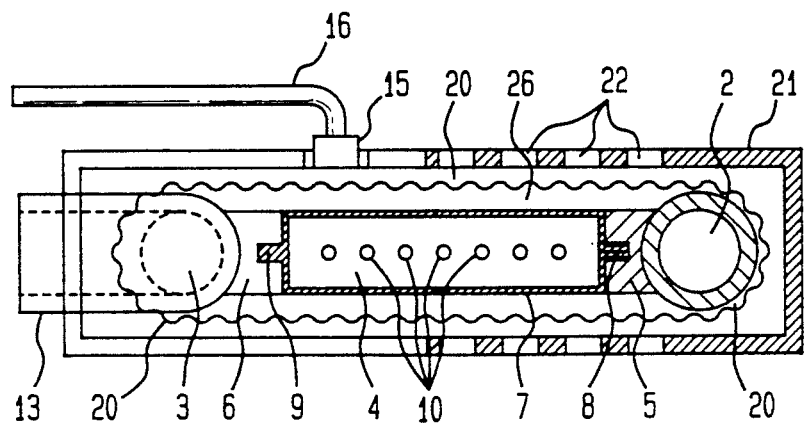
FIG. 3 is a cross-sectional view.

FIG. 3 is a cross section along the lines A-B-C-D of FIG. 2.

In accordance with FIG. 3, the plate-shaped electrode 7 is located in the guide rails 5, 6 of the side sections 2, 3 with its edge strips 8, 9. The box-shaped electrode 7, made of extension metal, has been provided on both sides with a protective mat 26 of an electrolyte-resistant plastic material, which during insertion of the electrode frame protects the pouch-like diaphragm 20 from damage by the surface of the electrode 7, because of its box-shape, the electrode 7 performs a support function for the diaphragm 20. The side section 3 has a circular hollow profile for the supply of the liquid ion conductor, while the side section 2 only has support functions and does not contain electrolyte. During operation the liquid ion conductor exits through openings 10 in the lower strap 4 in the direction of the electrode 7. The completely equipped frame 1 then is enclosed by the protective box 21, in the form of a pouch, provided with openings 22, where the openings 22 extend on both sides over the entire width of the box electrode 7.

Employment of the electrode element as an anode and a cathode will be described below; in this case, the electrode element in accordance with the invention, when used as an anode, is designated by the numeral 27 in FIGS. 4a, 4b, 4c, and the electrode element in accordance with the invention, when used as a cathode, is designated by the numeral 29 in FIGS. 5a, 5b, 5c.

Figure 4A:
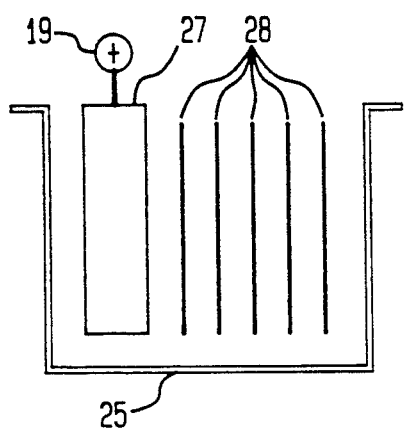
FIGS. 4a, 4b, 4c schematically show the employment of the electrode element as an anode in a metal recovery cell.
Figure 4B:
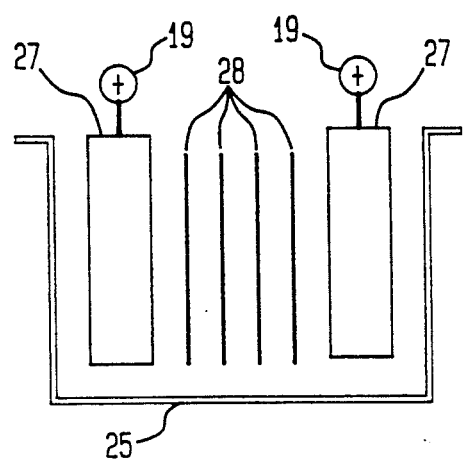
Figure 4C:
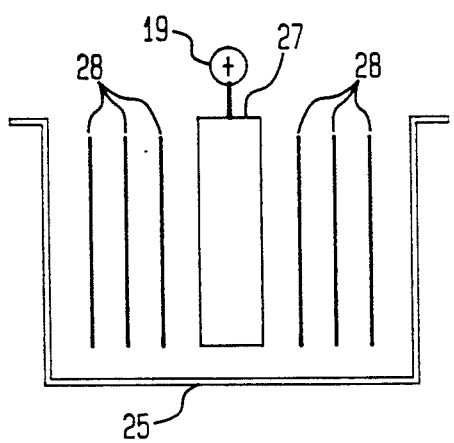

The electrode element 27, employed as an anode in the tank 27 of a metal recovery cell, is connected via the connecting contact 19 with the positive pole of a voltage source, not shown here for improved clarity, and is disposed in such a way, that it in accordance with FIG. 4a it is either disposed with one side located opposite a plurality of cathodes 28 or, in accordance with FIG. 4b in the form of two electrode elements 27 located opposite from each other and enclosing a plurality of cathodes 28; furthermore, in accordance with FIG. 4c, a single electrode element 27 as an anode can be surrounded on both sides by one or a plurality of cathodes 28. In accordance with the above mentioned German Letters Patent DE-PS 36 40 020, in this case, the cathodes 28 are connected with the negative pole of the voltage source.

Figure 5A:
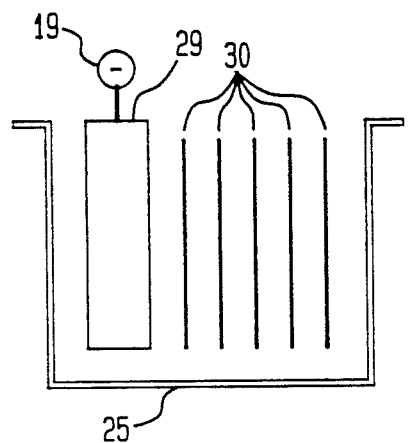
FIGS. 5a, 5b, 5c schematically show the employment of the electrode element as a cathode in an oxidation cell.
Figure 5B:
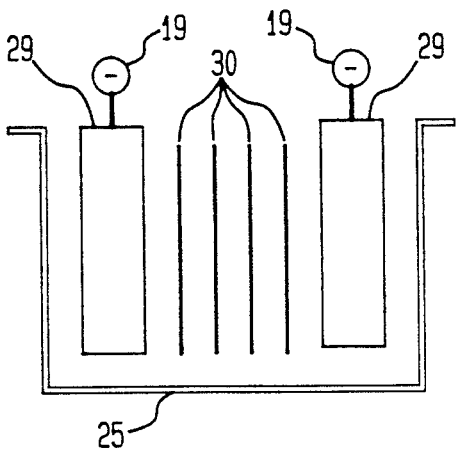
Figure 5C:
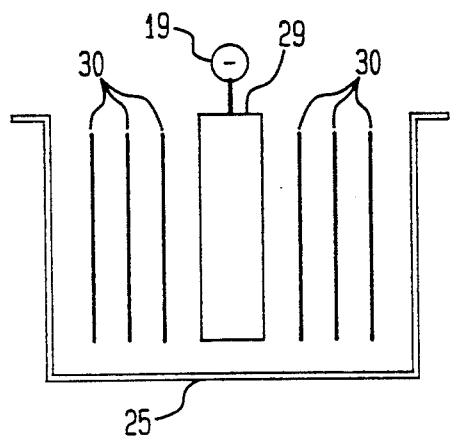

When the electrode element is employed as a cathode in the tank 25 of an oxidation cell, the electrode element 29, connected via the connecting contact 19 with the negative pole of a voltage source, in accordance with FIG. 5a is either disposed with one side located opposite a plurality of anodes 30 or, in accordance with FIG. 5b in the form of two electrode elements 29 located opposite from each other and enclosing a plurality of anodes 30; furthermore, in accordance with FIG. 5c, the electrode element 29 used as a cathode can be surrounded on both sides by one or a plurality of anodes 30. The anodes 30 are in this case each connected with the positive pole of the voltage source.

We claim:

1. An electrode element for an electrolysis cell for electrolytic precipitation of metals from a liquid containing metal ions, having
    a frame (1) provided with parallel side sections (2, 3) of electrically insulating plastic,
    each element including at least one conduit (13) for supplying a liquid ion conductor and at least one conduit (16) for the removal of this liquid ion conductor, where
    at least one planar active part is disposed between said conduits to serve as an electrode (7), along which the ion conductor flows and where the active surface of the electrode (7) is covered by an ion exchange diaphragm (20),
characterized in that
    said electrode element is used for partial dipping, up to an immersion line (17), in said liquid;
    the electrode (7) is removably supported in the side sections (2, 3) of the frame (1),
    that the diaphragm (20) defines a pouch enclosing at least the portion of the electrode (7) dipped into the metal-ion-containing liquid,
and that
    the pouch is enclosed by a protective box (21) of an electrically insulating plastic provided with openings 922), where at least a portion of the openings (22) are directed toward an active surface of the electrode (7).

2. An electrode element in accordance with claim 1, characterized in that
    a lower strap (4) connecting the two side sections of the frame has openings (10) for the supply of the ion conductor and
    an upper strap (11) connecting the two side sections (2, 3) is provided with at least one opening (15) for the removal of the ion conductor.

3. An electrode element in accordance with claim 1, characterized in that
    the pouch is clamped between the side sections (2, 3) of the frame (1) and the protective box (21).

4. An electrode element in accordance with claim 1, characterized in that all openings (22) of the protective box (21) are directed toward the active surfaces of the electrode (7).

5. An electrode element for an electrolysis cell for electrolytic precipitation of metals from a liquid containing metal ions, having
    a frame provided with parallel side sections (2, 3) of electrically insulating plastic,
    each element including at least one conduit (13) for supplying a liquid ion conductor and at least one conduit (16) for the removal of this liquid ion conductor, where
    at least one planar active part is disposed between said conduits to serve as an electrode (7), along which the ion conductor flows and where the active surface of the electrode (7) is covered by an ion exchange diaphragm (20),
characterized in that
    said electrode element is used for partial dipping, up to an immersion line (17), in said liquid;
    the electrode (7) is removably supported in the side sections (2, 3) of the frame (1),
    that the diaphragm (20) is formed as a pouch enclosing at least the portion of the electrode (7) dipped into the metal-ion-containing liquid,
    the pouch is enclosed by a protective box (21) of an electrically insulating plastic provided with openings (22), where at least a portion of the openings (22) are directed toward an active surface of the electrode (7)
and that
    the two side sections (2, 3) together with the lower strap (4) are defined at a periphery thereof by a pipe (13, 14) bent in a U,
    where one side section (2) is connected (13) at its upper end with the liquid supply.

6. An electrode element for an electrolysis cell for electrolytic precipitation of metals from a liquid containing metal ions, having
    a frame provided with parallel side sections 92, 3) of electrically insulating plastic,
    each element including at least one conduit (13) for supplying a liquid ion conductor and at least one conduit (16) for the removal of this liquid ion conductor, where at least one planar active part is disposed between said conduits to serve as an electrode (7), along which the ion conductor flows and where the active surface of the electrode (7) is covered by an ion exchange diaphragm (20), characterized in that said electrode element is used for partial dipping, up to an immersion line (17), in said liquid;

the electrode (7) is removably supported in the side sections (2, 3) of the frame (1), that the diaphragm (20) is formed as a pouch enclosing at least the portion of the electrode (7) dipped into the metal-ion-containing liquid, the pouch is enclosed by a protective box (21) of an electrically insulating plastic provided with openings (22), where at least a portion of the openings (22) are directed toward an active surface of the electrode (7)

and that the active surface of the electrode (7) consists of two plates extending parallel to each other, which are each connected at their side walls by a fold in the shape of a box electrode which is used for guidance in the side sections (2, 3) of the frame (1).

7. An electrode element in accordance with claim 6, characterized in that the side sections (2, 3) of the frame (1) are provided with guide rails (5, 6) located opposite each other, having grooves for receiving the folds which are embodied as edge strips (8, 9).

* * * * *